United States Patent
Fujii (10) Patent No.: US 9,672,448 B2
(45) Date of Patent: *Jun. 6, 2017

(54) PRUNING AND LABEL SELECTION IN HIDDEN MARKOV MODEL-BASED OCR

(71) Applicant: Google Inc., Mountain View, CA (US)

(72) Inventor: Yasuhisa Fujii, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/941,470

(22) Filed: Nov. 13, 2015

(65) Prior Publication Data

US 2016/0070992 A1 Mar. 10, 2016

Related U.S. Application Data

(63) Continuation of application No. 14/144,854, filed on Dec. 31, 2013, now Pat. No. 9,189,708.

(51) Int. Cl.
*G06K 9/00* (2006.01)
*G06K 9/62* (2006.01)
*G06K 9/72* (2006.01)
*G06K 9/46* (2006.01)
*G06F 17/27* (2006.01)

(52) U.S. Cl.
CPC ....... *G06K 9/6297* (2013.01); *G06F 17/2765* (2013.01); *G06K 9/4604* (2013.01); *G06K 9/72* (2013.01); *G06K 2209/01* (2013.01)

(58) Field of Classification Search
None
See application file for complete search history.

(56) References Cited

U.S. PATENT DOCUMENTS

| | | | | | |
|---|---|---|---|---|---|
| 5,542,006 | A | * | 7/1996 | Shustorovich | G06K 9/32 382/156 |
| 5,594,809 | A | * | 1/1997 | Kopec | G06K 9/6297 382/161 |
| 5,644,652 | A | * | 7/1997 | Bellegarda | G06K 9/6297 382/186 |
| 5,825,919 | A | * | 10/1998 | Bloomberg | G06K 9/00463 382/171 |

(Continued)

OTHER PUBLICATIONS

Modeling and recognition of cursive words with hidden markov models, Cho et al.,Pergamon, 0031-3203(95)00041-0, 1995, pp. 1941-1953.*

(Continued)

*Primary Examiner* — Jayesh A Patel
(74) *Attorney, Agent, or Firm* — Fish & Richardson P.C.

(57) ABSTRACT

Systems and techniques are provided for pruning a node from a possible nodes list for Hidden Markov Model with label transition node pruning. The node may be a label transition node. A frame may be at a predicted segmentation point in decoding input with the Hidden Markov Model. The node may be scored at the frame. The node may be pruned from the possible nodes list for the frame when score for the node is greater than the sum of a best score among nodes on the possible nodes list for the frame and a beam threshold minus a penalty term. A possible nodes list may be generated for a subsequent frame using label selection. A second node may be pruned from the possible nodes list for the subsequent frame with early pruning.

25 Claims, 7 Drawing Sheets

(56) References Cited

U.S. PATENT DOCUMENTS

| | | | |
|---|---|---|---|
| 5,933,525 A * | 8/1999 | Makhoul | G06K 9/00879 |
| | | | 382/185 |
| 6,243,679 B1 * | 6/2001 | Mohri | G10L 15/193 |
| | | | 704/10 |
| 7,499,588 B2 * | 3/2009 | Jacobs | G06K 9/00463 |
| | | | 382/173 |
| 8,311,825 B2 * | 11/2012 | Chen | G06K 9/72 |
| | | | 704/240 |
| 8,335,381 B2 * | 12/2012 | Rodriguez Serrano | G06K 9/6297 |
| | | | 382/156 |
| 8,873,813 B2 * | 10/2014 | Tadayon | G06K 9/00 |
| | | | 382/118 |
| 9,189,708 B2 * | 11/2015 | Fujii | G06K 9/72 |
| 2002/0150300 A1 * | 10/2002 | Lee | G06K 9/72 |
| | | | 382/229 |
| 2003/0046073 A1 * | 3/2003 | Mori | G10L 15/193 |
| | | | 704/251 |
| 2005/0259866 A1 | 11/2005 | Jacobs et al. | |
| 2009/0099841 A1 | 4/2009 | Chen | |
| 2010/0128985 A1 * | 5/2010 | El-Sana | G06K 9/00402 |
| | | | 382/189 |
| 2014/0079297 A1 | 3/2014 | Tadayon et al. | |

OTHER PUBLICATIONS

The advantage of using—recognition, Elms et al., IJDAR, Oct. 15 1997, pp. 18-36.*

Elms et al., "The Advantage of Using an HMM-based Approach for Faxed Word Recognition," IJDAR (1998), 1:18-36.

* cited by examiner

PRUNING AND LABEL SELECTION IN HIDDEN MARKOV MODEL-BASED OCR

CROSS-REFERENCE TO RELATED APPLICATION

This is a continuation of U.S. application Ser. No. 14/144,854, filed on Dec. 31, 2013, the disclosure of which is hereby incorporated by reference in its entirety.

BACKGROUND

Hidden Markov Model-based optical character recognition (OCR) may need to evaluate a large number of hypotheses, represented by paths through states of the Hidden Markov Model, at the boundaries between characters. An optical character recognition system using a Hidden Markov Model may solve both character segmentation, locating the boundaries between characters in input images of text, and classification, predicting labels for the characters segmented from the input image, at the same time. This may result in the OCR system attempting to evaluate and classify all possible characters that the Hidden Markov Model has been trained to recognize at each character boundary, or segmentation point. The computational cost of performing OCR may be increased by the large number of fan-out connections at a character boundary, which may make the decoding time unacceptably long, especially for languages which have a large number of characters.

Hidden Markov Model-based automated speech recognition (ASR) may operate similarly to Hidden Markov Model-based OCR, with segmentation points and boundaries between words. Both ASR and OCR systems may use time-synchronous Viterbi decoding to decode input using a Hidden Markov Model. In spoken language, sounds may be dependent on surrounding sounds. This may allow ASR systems to use context dependent models to form acoustic models and a trie-based structure which shares prefixes of words to form a decoding network, resulting in a reduction in the number of words an ASR system has to evaluate at word boundaries, decreasing the fan-out. In written language, all characters may be connected to all other characters, so OCR systems may use optical models and a linear structure which does not share any prefixes among characters to form a decoding network. OCR systems may not be able to reduce the number of characters considered at a predicted segmentation point in the same manner as an ASR system. Standard beam pruning algorithms may be used with OCR systems, but the decoding speed may still be too slow because of the fan-out at character boundaries.

BRIEF SUMMARY

According to an embodiment of the disclosed subject matter, a node of a Hidden Markov Model may be received. The node may be a label transition node. A frame may be received. The frame may be a predicted segmentation point. The node may be pruned from a possible nodes list with label transition node pruning Label transition node pruning may include scoring the node at the frame to obtain a score, and pruning the node when the score is greater than the sum of a best score at the frame and a beam threshold minus a penalty term.

A possible nodes list for a subsequent frame may be generated with label selection. Label selection may include scoring a label at the subsequent frame to obtain a label score, ranking the label based on the label score to obtain a label rank, and adding the first node of the label to the possible nodes list for the subsequent frame when the label score is less than or equal to a sum of a best label score at the frame and a first parameter or the label rank is less than or equal to a second parameter.

A second node may be pruned from the possible nodes list for the subsequent frame with early pruning Early pruning may include scoring the second node at the subsequent frame with an observation feature function to obtain an observation score, and pruning the second node when an early pruning score is greater than a sum of the current best score at the subsequent frame and the beam threshold, where the previous node score is a score for a previous node to the second node at a previous frame to the subsequent frame, where the early pruning score is the sum of the observation score and the previous node score. Early pruning may also include estimating a parameter based on a transition feature function and adding the parameter to the early pruning score.

The Hidden Markov Model may be a model for optical character recognition or a model for automated speech recognition. The label may include a label name associated with a character from a character set. The frame may be a segment of an image of text. The label may be scored at the frame using fast-match. The possible nodes list may be used in time-synchronous Viterbi decoding. The predicted segmentation point may be a character boundary.

According to an embodiment of the disclosed subject matter, a means for receiving a node of a Hidden Markov Model, where the node is a label transition node, a means for receiving a frame, where the frame is a predicted segmentation point, and a means for pruning the node from a possible nodes list with a means for label transition node pruning, where the means for label transition node pruning includes a means for scoring the node at the frame to obtain a score, and a means for pruning the node when the score is greater than the sum of a best score at the frame and a beam threshold minus a penalty term are included.

A means for generating a possible nodes list for a subsequent frame with a means for label selection, where the means for label selection includes a means for scoring a label at the subsequent frame to obtain a label score, a means for ranking the label based on the label score to obtain a label rank, and a means for adding the node to the possible nodes list for the subsequent frame when the label score is less than or equal to a sum of a best label score at the frame and a first parameter or the label rank is less than or equal to a second parameter, a means for pruning a second node from the possible nodes list for the subsequent frame with a means for early pruning, where the means for early pruning includes a means for scoring the second node at the subsequent frame with an observation feature function to obtain an observation score and a means for pruning the second node when an early pruning score is greater than a sum of the current best score at the subsequent frame and the beam threshold, where the previous node score is a score for a previous node to the second node at a previous frame to the subsequent frame, and where the early pruning score is the sum of the observation score and the previous node score, a means for estimating a parameter based on at least one transition feature function, a means for adding the parameter to the early pruning score, a means for storing the label score, a means for reusing the label score during decoding of the frame, and a means for pruning the second node with a means for histogram pruning, where the means for histogram pruning includes a means for pruning the second node if the second node does not have an early pruning score that is at least the n-th best exact pruning score at the subsequent frame, where n is a tunable parameter, are also included.

Systems and techniques disclosed herein may allow for pruning of nodes when decoding a Hidden Markov Model for an input during character or speech recognition. Additional features, advantages, and embodiments of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Pruning the number of nodes being evaluated at a character boundary in Hidden Markov Model-based OCR may reduce computational demands for decoding and predicting labels for an input image of text. In an implementation of the disclosed subject matter, a Hidden Markov Model may be trained. For example, the Hidden Markov Model may be trained to perform optical character recognition using images of text. The Hidden Markov Model may include nodes, transitions between the nodes, and transition probabilities for the transitions. The nodes may each include emissions and emissions probabilities. The emissions for a node may be, for example, segments of an image of a character represented in any suitable manner, such as bitmap or vector representation, associated with the node. The emissions probability may be the probability with which an emission associated with the node is emitted by the node, which may allow the node to be probabilistically correlated with an observation. Groups of nodes in the Hidden Markov Model may be labels in the Hidden Markov Model. A label in the Hidden Markov Model may be associated with a label name. For example, in Hidden Markov Model-based OCR, one group of nodes may be a label associated with the label name "A", for a capital A, while another group of nodes may be associated with a label name "B", for a capital B. The group of nodes for a label may have a first node for the label, where a path through the Hidden Markov Model enters the group of nodes, and a last node for the label, where the path through the Hidden Markov Model exits the group of nodes. The last node for the label may be the label transition node for the label.

Input to be decoded may be divided into frames, with each frame representing an observation that can be correlated to the nodes, or states, in the Hidden Markov Model. For example, in Hidden Markov Model-based OCR, an image of text may be segmented into frames using a sliding window, where the frames may be, for example, the same height and width as each other, and each frame may contain a segment of the image of text. In Hidden Markov Model-based ASR, audio may be segmented into frames, where the frames may contain some length of the audio. The frames may be decoded with the Hidden Markov Model to label the input. For example, images of characters in the image of text may be labeled with the proper character name. Decoding may be performed by, for example, brute force consideration of all paths through the nodes and transitions of the Hidden Markov Model, or by, for example, time-synchronous Viterbi decoding. The decoding may determine a corresponding node in the Hidden Markov Model for each frame of the input. For example, a node may correspond to the segment of the image of text within a frame based on the nodes emissions and emission probabilities. A sequence of frames that make up an image of a character may be correlated to one of the groups of nodes that form a label in the Hidden Markov Model based on the nodes that correspond to the individual frames. The label name, which may be a character name, associated with the label may be used to label the image of the character. Labels may be associated with sequences of frames during the decoding of the input.

During the decoding of the input, a possible nodes list may be used for each frame of the input. The possible nodes list for a frame may be a list of nodes in the Hidden Markov Model that may be evaluated to determine whether they correspond to the frame. For example, if the frame is a first frame of the input, all of the nodes in the Hidden Markov Model that are the first node for a label may be on the possible nodes list, as the sequence of frames starting with the first frame may end up being labeled with any label name associated with any label in the Hidden Markov Model. At a predicted segmentation point, such as, for example, a character boundary in frames that include segments of an image of text, the possible nodes list may also include all of the nodes in the Hidden Markov Model that are the first node for a label. The predicted segmentation point may be a frame where segmentation, for example, between characters at a character boundary, is predicted to occur during decoding of the input. For example, a predicted segmentation point may occur in a frame that is the last frame of an image of a character. The nodes on the possible nodes list at the predicted segmentation point may be label transition nodes, as the nodes may be the last nodes of the labels in the Hidden Markov Model. Because the segmentation point is predicted, the possible nodes list may also include nodes that are not label transition nodes, as the decoding may also evaluate a prediction that the frame is not a segmentation point where a new character begins, but is in the middle of a character.

For example, in written language, any character in the language may be followed by any other character. Once a label name has been predicted for a sequence of frames, the next frame may be predicted to be the start of a new character which will receive its own label name, and the possible nodes for that next frame may include all of the nodes connected from label transition nodes, which may be the last nodes of the labels in the Hidden Markov Model. For example, if the Hidden Markov Model has been trained to recognize all 26 letters of the English alphabet in both lower and upper case, the possible nodes list for a frame after a label transition node may include at least 52 nodes, one for each distinct character in the character set. Additional nodes may be included if a prediction that the previous frame is not a segmentation point is still being evaluated. The Hidden Markov Model may have a label for each character in the character set, and each label may have a separate first node. Each of the 52 nodes may need to be evaluated during the decoding of the frame, which may be computationally expensive.

The number of nodes on the possible nodes list for a frame after a predicted segmentation point may be reduced using label transition node pruning Label transition node pruning may be used when a node is a label transition node. The node may be a label transition node when the node is the last node of a label, and may be on the possible nodes list for the frame at the predicted segmentation point. The nodes on the possible nodes list for the frame may be scored. The score for each node may be based on any suitable heuristics, such as, for example, transition feature functions that generate a transition score, observations feature functions that generate an observation score, and the score for a previous node to the node at a previous frame to the frame. The observation feature functions may, for example, include a comparison between the contents of the frame, such as the segment of the image of text in the frame, and the emissions for the node, factoring in the emissions probabilities. The transition feature function may, for example, be based on a character-level n-gram language model. The score may be an indication of how well the node corresponds to the frame based on features of the node and the frame, properties of the previous node to the node, and the score given to the previous node at a previous frame. The previous node may be a possible node for the previous frame that is connected by a transition to the node in the Hidden Markov Model. A lower score may indicate a higher level of correspondence. The score may be compared to the scores for all of the other nodes on the possible nodes list for the frame to determine if the node should be pruned from the possible nodes list. Pruning label transition nodes from the possible nodes list for the frame at the predicted segmentation point may reduce the number of nodes that can be on the possible nodes list for the subsequent frame, after the predicted segmentation point.

For example, if the node is a label transition node, if the score for the node is greater than the sum of a score for the best, for example, lowest, scoring node at the frame and a beam threshold minus a penalty term, the node may be pruned. The beam threshold may be a parameter used control how close the node's score must be to the score of the best scoring node from the possible nodes list for the frame in order to not be pruned, and may be applied to pruning both label transition nodes and nodes that are not label transition nodes. The penalty term may be a reduction in the beam threshold applied only when the node is a label transition node, and may increase the number of nodes that are pruned. For example, if the score for a node is 0.5, and the score for the best scoring node is 0.3, the node may not be pruned if the beam threshold minus the penalty term is greater than or equal to 0.2.

The penalty term used when the node is a label transition node may be a product of a label transition penalty factor and the beam threshold. The label transition penalty factor may be any suitable value, for example, between 0 and 1 inclusive. The label transition penalty factor may be used during pruning in place of the penalty term. For example, if the score for the node is greater than the sum of a score for the best scoring node at the frame and the product of the result of 1 minus the label transition penalty factor and the beam threshold, the node may be pruned.

The number of nodes on the possible nodes list for the frame after the predicted segmentation point may be reduced using label selection. Label selection may be used to reduce the number of nodes connected to a label transition node for the frame after the predicted segmentation point. Labels in the Hidden Markov Model may be evaluated to determine which labels may be allowed to be used to predict label names for the sequence of frames starting with the frame after the predicted segmentation point. Each label in the Hidden Markov Model may be scored at the frame, for example, using fast-match, or using an optical model that is used in the decoding. The label at the frame may also be given a label rank based on the scores for the other labels at the frame. The score and label rank may be used to determine whether the label is allowable, and whether the first node for the label should be pruned from the possible nodes list for the frame after the predicted segmentation point.

For example, the label may be added to a set of allowable labels when the score for the label is less than or equal to the sum of the best, for example, lowest, score, among all of the scores for labels at the frame and a first parameter, and the label rank for the label is less than or equal to a second parameter. The first parameter may be used to control how close the label's score must be to the score of the best scoring label at the frame in order to be added to the set of allowable labels. The second parameter may limit the number of labels that can be added to the set of allowable labels. For example, if the label has a score is 0.5, and a label rank of 5, and the score for the best label at the frame is 0.3, the label will be added to the set of allowable labels if the first parameter is greater than or equal to 0.2 and the second parameter is greater than or equal to 5.

The first node of any label in the Hidden Markov Model that is not added to the set of allowable labels for the frame may be pruned from, or not added to, the possible nodes list for the frame after the predicted segmentation point. Since the label name for the label may not be predicted for the sequence of frames starting after the predicted segmentation point, the first node of the label may not be connected to the label transition node for the frame at the predicted segmentation point. For example, if the frames include an image of text, the labels may correspond to characters in the character set, with each label having a label name identifying one of the characters. Label selection may reduce the possible nodes list at a frame after a character boundary by reducing the number of character names that can be predicted for the character in the frames after the predicted segmentation point, or character boundary.

The number of nodes on the possible nodes list for any frame in the input, including after the predicted segmentation point, may be reduced using early pruning. The nodes on the possible nodes list for the frame may be scored based on observation features, resulting in an observation score for each node. The observation score for each node may be based on any suitable heuristic, such as, for example, a comparison between the contents of the frame, such as the segment of the image of text in the frame, and the emissions for the node, factoring in the emissions probabilities. The observation score may be an indication of how well the node corresponds to the frame based on features of the node and frame, and a lower observation score may indicate a higher level of correspondence. The sum of the observation score and the score for the previous node at the previous frame may be an early pruning score, and may be compared to the current best exact pruning score for all the other nodes on the possible nodes list that have already been evaluated for the frame to determine if the node should be pruned from the possible nodes list. If the node is not pruned from the possible nodes list, the node may receive an exact pruning score, including the transition score. The early pruning score may differ from the score used in label transition node pruning because the transition score may not be used, as adding the transition score may always make the resulting score worse. Not calculating the transition score may result in lower computation costs.

For example, if an early pruning score is greater than the sum of the score for the current best scoring node at the frame, where the best scoring node may be the node with the lowest exact pruning score at the frame among already evaluated nodes, and the beam threshold, the node may be pruned. The early pruning score may be, for example, the sum of the observation score for the node and the score for the previous node at the previous frame. As a specific example, if the observation score for a node is 0.3, the score for the previous node at the previous frame is 0.2, and the exact pruning score for the current best scoring node is 0.3, the node may not be pruned if the beam threshold greater than or equal to 0.2. A node that is not pruned by early pruning may be given an exact pruning score. If the exact pruning score for the node is better, for example, lower, than the current best score at the frame, the node may become the current best scoring node at the frame.

Early pruning also may use a tunable parameter, which may be an estimation of the transition score for all of the nodes on the possible nodes list. The tunable parameter may be added to the early pruning score when determining whether the node should be pruned.

The early pruning score also may be used to prune the possible nodes list using histogram pruning Histogram pruning may only retain a preset number of paths through the Hidden Markov Model, and thus only a preset number of nodes on the possible nodes list for the frame. The early pruning score may be used to rank the nodes on the possible nodes list, and retain only the preset number of best scoring nodes.

Once the possible nodes list has been pruned, the remaining nodes on the possible nodes list may be evaluated during decoding to determine which of the nodes may correspond best to the frame after the predicted segmentation point. For example, standard pruning methods such as beam pruning may also be used by the time-synchronous Viterbi decoding to prune additional nodes from the possible nodes list. Fewer nodes may need to be considered by the decoding, as the fan-out may have been reduced by pruning. For example, if the original fan-out resulted in 52 nodes on the possible nodes list, pruning may reduce the possible nodes list to, for example, 12 nodes. This may reduce the computational costs incurred at predicted segmentation points in the input, such as at character boundaries in the image of text used during Hidden Markov Model-based OCR.

After the frame has been decoded, a possible nodes list for the next frame may then be generated based on the transitions in the Hidden Markov Model for the nodes remaining in the possible nodes list, unless the frame is the last frame of the input, in which case no possible nodes list for a next frame may be needed.

Figure 1:
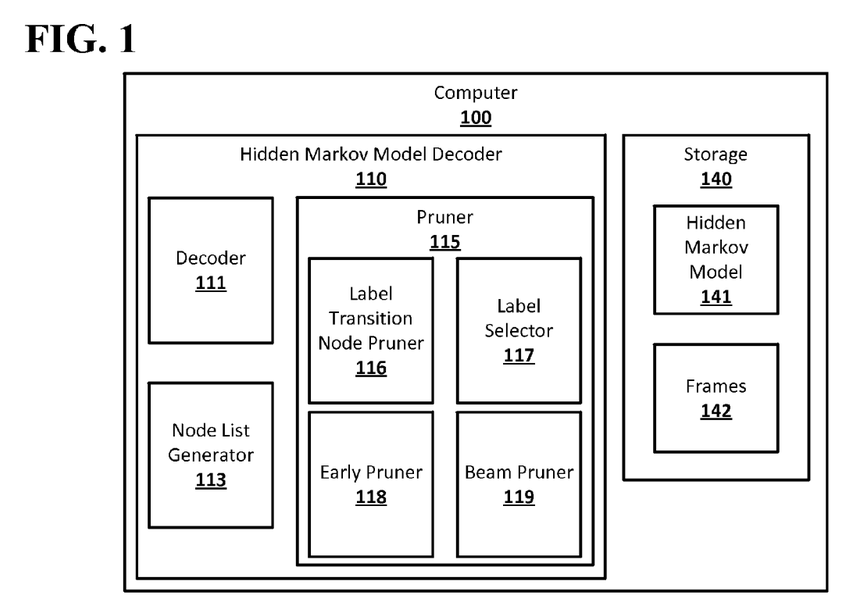
FIG. 1 shows an example system suitable for decoding input to a Hidden Markov Model with pruning and label selection according to an implementation of the disclosed subject matter.

FIG. 1 shows an example system suitable for decoding input to a Hidden Markov Model with pruning and label selection according to an implementation of the disclosed subject matter. A computer 100 may include a Hidden Markov Model decoder 110 and storage 140. The computer 100 may be any suitable device, such as, for example, a computer 20 as described in FIG. 9, for implementing the Hidden Markov Model decoder 110, and the storage 140. The computer 100 may be a single computing device, or may include multiple connected computing devices. The Hidden Markov Model decoder 110 may include a decoder 111, a pruner 115, and a node list generator 113. The decoder 111 may decode an input of frames 142 with a Hidden Markov Model 141 and output predictions for the input using the pruner 115. The pruner 115 may prune nodes from a possible nodes list, and may include a label transition node pruner 116, a label selector 117, an early pruner 118, and a beam pruner 119. The label transition node pruner 116 may use a score for nodes in the Hidden Markov Model 141 to prune the nodes from a possible nodes list used by the decoder 111 when decoding a frame from the frames 142. The label selector 117 may use label scores and label ranks to create a set of allowed labels and prune the nodes from the possible nodes list used by the decoder 111 according to the set of allowed labels. The early pruner 118 may use observation scores and transition scores for the nodes in the Hidden Markov Model 141 to prune the nodes from the possible nodes list used by the decoder 111. The beam pruner 119 may use beam pruning to prune the nodes from the possible nodes list used by the decoder 111. The node list generator 113 may generate the possible nodes list for the next frame from the frames 142 after the decoder 111 has decoded the frame. The storage 140 may store the Hidden Markov Model 141 and the frames 142.

Figure 2:
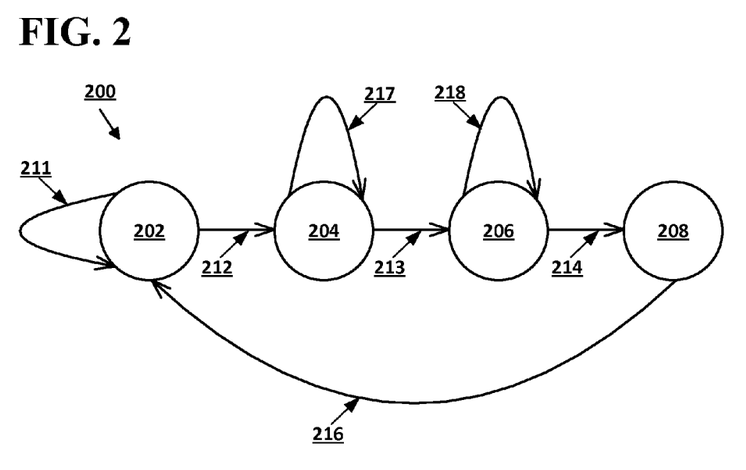
FIG. 2 shows an example of a Hidden Markov Model for a label according to an implementation of the disclosed subject matter.

FIG. 2 shows an example of a Hidden Markov Model for a label according to an implementation of the disclosed subject matter. A Hidden Markov Model 200 may be used by, for example, a Hidden Markov Model-based OCR system. The Hidden Markov Model 200 may be a left-to-right Hidden Markov Model trained to recognize an individual item, such as, for example, an image of character from a character set, and may include nodes 202, 204, 206, and 208, and transitions 211, 212, 213, 214, 216, 217 and 218. Each of the transitions 211, 212, 213, 214, 216, 217 and 218 may have an associated transition probability, which may be the probability of transitioning from the node at the beginning of the transition to the node at the end of the transition when changing nodes within the Hidden Markov Model 200. For example, if the transition probability of transition 212 is 0.75, or 75%, then a transition may be made to the node 204 when the node 202 is the starting node 75% of the time. A transition between the nodes 202, 204, 206, and 208 in the Hidden Markov Model 200 may occur when, for example, the decoder 111 moves from one frame of the frames 142 to the next frame of the frames 142, and evaluates possible paths through the transitions 211, 212, 213, 214, 216, 217 and 218 and nodes 202, 204, 206, and 208 of the Hidden Markov Model 200. The Hidden Markov Model 200 may be referred to as a label 200, and may be associated with a label name based on the item the Hidden Markov Model 200 was trained to recognize. The node 202 may be the first node of the label 200, and the node 208 may be the label transition node for the label 200, and may not have a self-transition or an associated emission.

Figure 3:
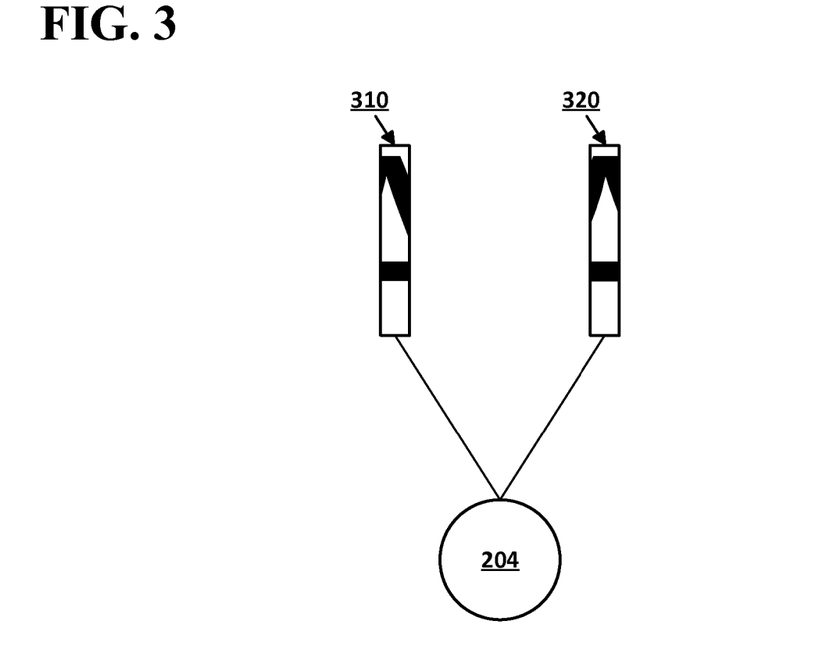
FIG. 3 shows an example of emissions for a node according to an implementation of the disclosed subject matter.

FIG. 3 shows an example of emissions for a node according to an implementation of the disclosed subject matter. The nodes 202, 204, and 206 of the Hidden Markov Model 200 may be associated with emissions, which may be compared with observations in the frames 142 when the decoder 111 is making predictions for the frames 142. For example, if the Hidden Markov Model 200 is trained to recognize the character of an uppercase A, the emissions 310 and 320 for the node 204 may be segments of an image of an uppercase A, represented in any suitable manner, including, for example, bitmap and vector representations. The emissions 310 and 320 may have associated emission probabilities, which may be the probabilities with which the node 204 emits each of the emissions 310 and 320.

Figure 4:
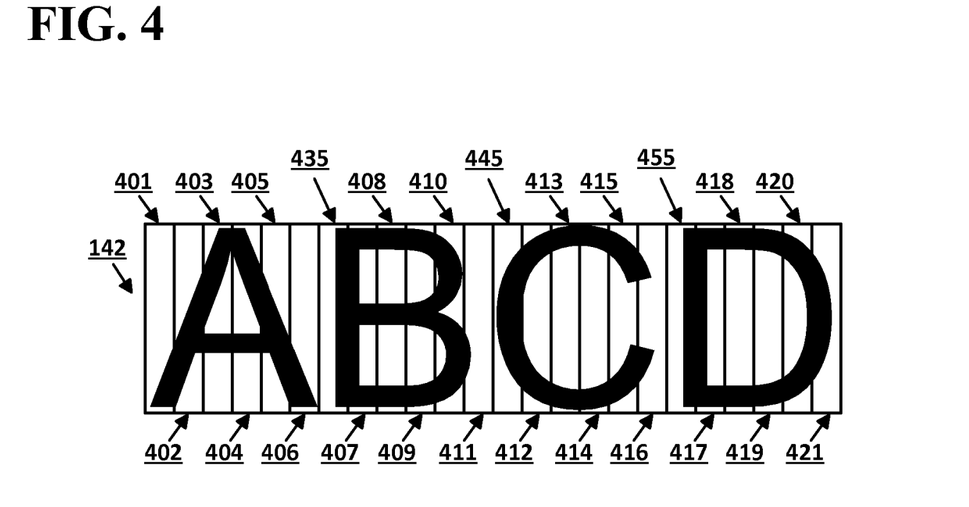
FIG. 4 shows an example of frames of an image of text according to an implementation of the disclosed subject matter.

FIG. 4 shows an example of frames of an image of text according to an implementation of the disclosed subject matter. The frames 142 may be sequential segments of the input for which the decoder 111 will predict labels. For example, the frames 142 input to a decoder 111 for a Hidden Markov Model decoder 110 for performing OCR may each include a segment of an image of text, as in the frames 401, 402, 403, 404, 405, 406, 407, 408, 409, 410, 411, 412, 413, 414, 415, 416, 417, 418, 419, 420, 421, 435, 445, and 455, which may be produced using a sliding window. The decoder 111 may use the emissions 310 and 320, and emissions for all other nodes in the Hidden Markov Model 141, along with emission probabilities, transitions, and transition probabilities, when decoding the frames 142. The frames 435, 445, and 455 may be predicted segmentation points in the frames 142, and may be identified by the decoder 111 as frames in which a new is predicted to character begin. For example, the decoder 111 may use the Hidden Markov Model 200 to determine that the sequences of frames 401, 402, 403, 404, 405 and 406 may be labeled with "A", and to make frame 406 a predicted segmentation point, or character boundary. The frame 406 may be a predicted segmentation point on some paths being evaluated by the decoder 111, but the decoder 111 may also still be evaluating paths that do not label the sequences of frames ending at the frame 406 with "A" when decoding the frame 435. On those paths, the frame 435 may be evaluated as part of the sequence of frames beginning at the frame 401, rather than as being after a character boundary where a new character may begin. The frame 435 may be the frame after the predicted segmentation point.

Figure 5:
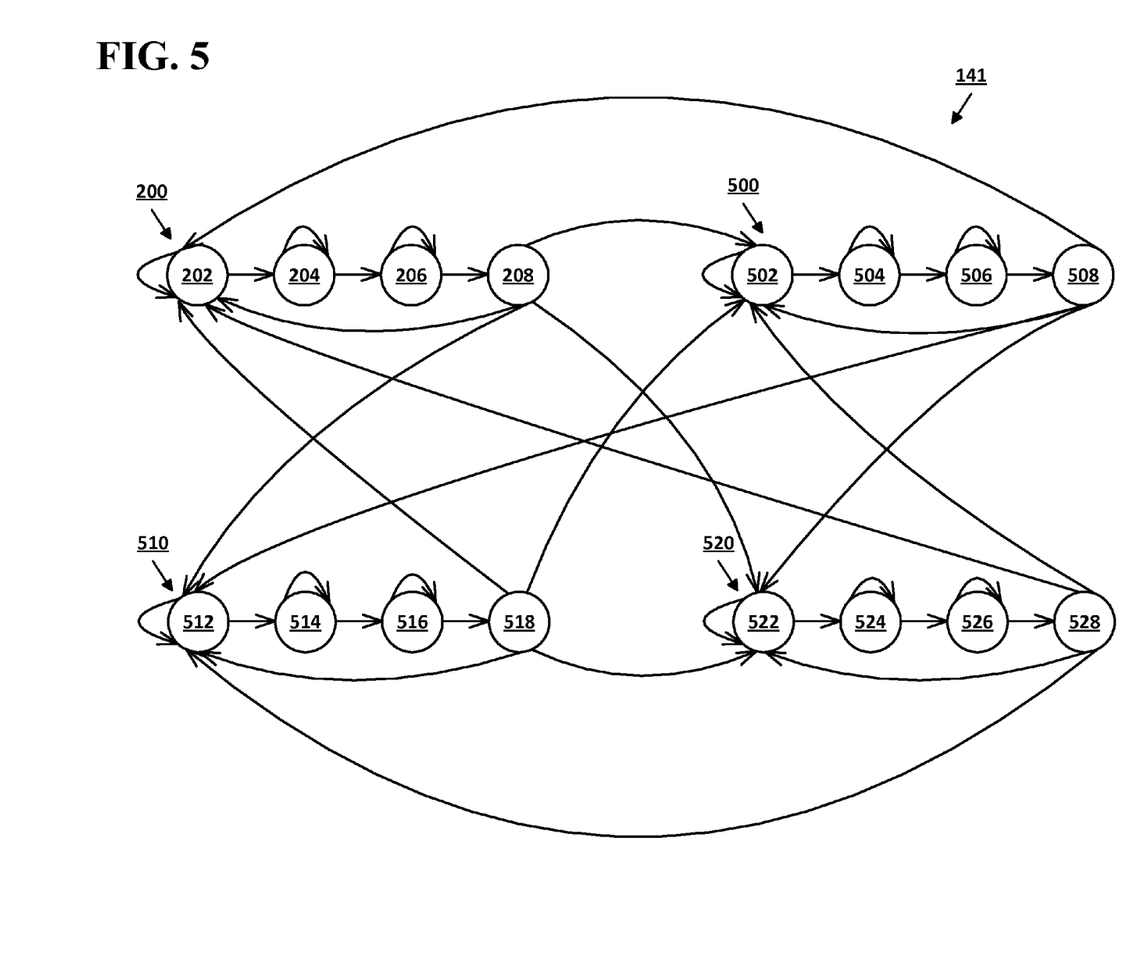
FIG. 5 shows an example of a Hidden Markov Model for character recognition for a four character set according to an implementation of the disclosed subject matter.

FIG. 5 shows an example of a Hidden Markov Model for character recognition for a four character set according to an implementation of the disclosed subject matter. Hidden Markov Models trained for recognizing items of the same type, for example, different characters in a character set, may be connected together to form a Hidden Markov Model for a set of the items. For example, the Hidden Markov Model 200 for the character "A" may be joined with a Hidden Markov Model 500 for the character "B", a Hidden Markov Model 510 for the character "C", and a Hidden Markov Model 520 for the character "D", to form a Hidden Markov Model for the four character set of "A B C D", which may be the Hidden Markov Model 141. The Hidden Markov Model 500 may include nodes 502, 504, 506, and 508. The Hidden Markov Model 510 may include nodes 512, 514, 516, and 518. The Hidden Markov Model 520 may include nodes 522, 524, 526, and 528. The decoder 111 may use the Hidden Markov Model 141 to decode the frames 142 which may include an image of text with characters from the four character set, and predict labels for the images of characters in the image of text. The Hidden Markov Models 500, 510, and 520 may be referred to as labels 500, 510, and 520, as each may be associated with a label name for the character the Hidden Markov Model was trained to detect. The nodes 208, 508, 518, and 528 may be the label transition nodes of the Hidden Markov Model 141, as they may be last nodes of the labels 200, 500, 510, and 520.

Figure 6:
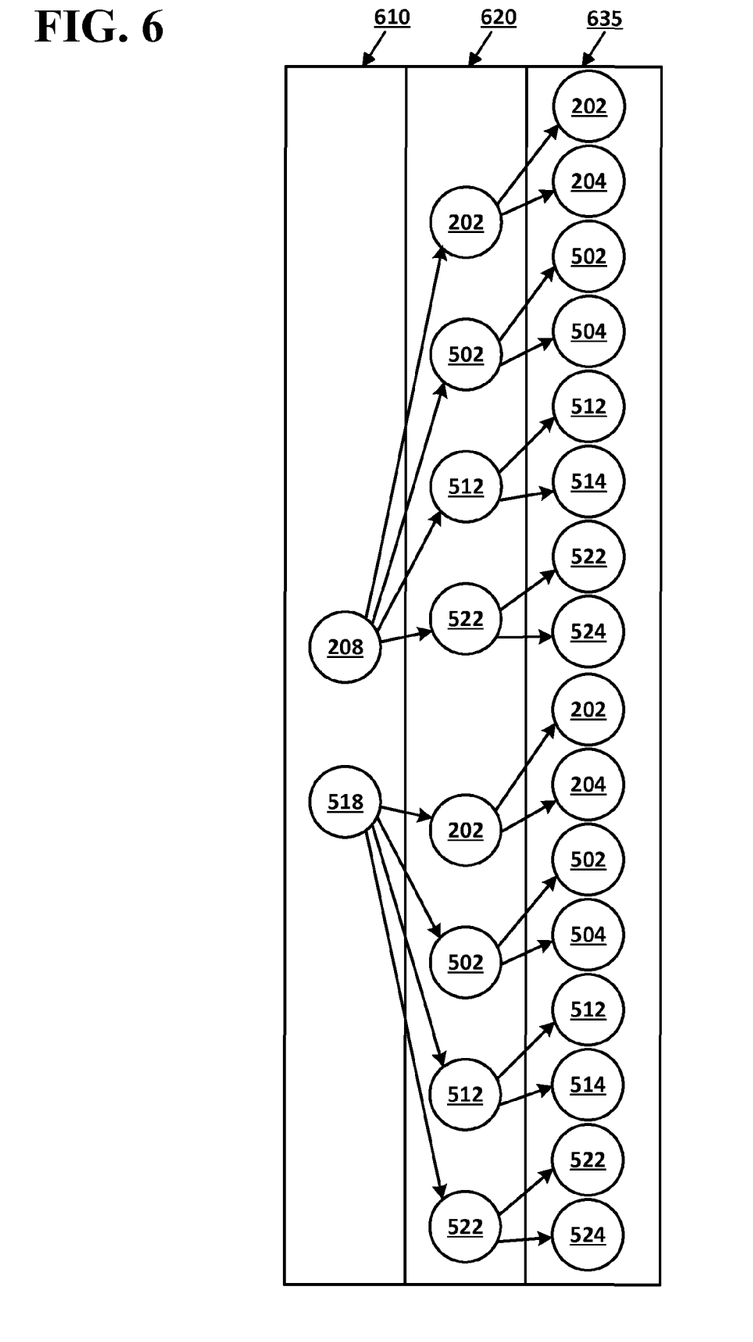
FIG. 6 shows an example of a possible nodes list and fan-out at a predicted segmentation point according to an implementation of the disclosed subject matter.

FIG. 6 shows an example of a possible nodes list and fan-out at a predicted segmentation point according to an implementation of the disclosed subject matter. During the decoding of the frames 142, the decoder 111 may decode the individual frames 401, 402, 403, 404, 405, 406, 435, 407, 408, 409, 410, 411, 445, 412, 413, 414, 415, 416, 455, 417, 418, 419, 420, 421, in sequence. For each of the frames 142, the decoder 111 may evaluate the nodes of the Hidden Markov Model 141 to determine which nodes best correspond to each individual frame in sequence, constructing a path through the Hidden Markov Model 141 using, for example, time-synchronous Viterbi decoding. The decoder 111 may maintain and evaluate multiple paths simultaneously while determining which path, and related set of correspondence between nodes and frames, is best. The nodes evaluated by the decoder 111 for each frame may be based on the last nodes in the paths through the Hidden Markov Model 141 kept by the decoder 111 in an immediately preceding frame. For example, if the decoder 111 keeps paths that have last nodes 504 and 506 at the frame 408, the decoder 111 may evaluate the nodes 504, 506, and 508 at the frame 409, with the node 506 being evaluated for two separate paths. The nodes evaluated by the decoder 111 for each frame may be, for example, kept on a possible nodes list, which may include nodes from the Hidden Markov Model 141 that may possibly correspond to the frame being decoded from the frames 142.

When the decoder 111 finds a path through part of the Hidden Markov Model 141 for a sequence of the frames 142 that has reached the last node for a label, the label transition node, the label name for the label may be predicted for the item in the sequence of frames, and the frame may be a predicted segmentation point. A new label may begin in the frame after the predicted segmentation point. The label transition node may be associated with the segmentation point in the frame, while the image in the frame may be associated with the emission from the node prior to the label transition node. For example, the decoder 111 may construct a path through nodes 202, 202, 204, 204, 206, and 206, for the frames 401, 402, 403, 404, 405, and 406. Upon reaching the node 206, the decoder 111 may predict that label for the character in the frames 401, 402, 403, 404, 405, and 406 may be the label name for the label 200, "A". The decoder 111 may also determine that the frame 406 is a predicted segmentation point, or character boundary. The frame 406 may be associated with the emission from the node 206, and the predicted segmentation point at the frame 406 may be associated with the label transition node 208. The predicted path through the Hidden Markov Model 141 for the frames 401, 402, 405, 404, 405, and 406 may be through the nodes 202, 202, 204, 204, 206, 206 and 208. When the decoder 111 reaches one of the frames 142 that is after a predicted segmentation point, the number of nodes on the possible nodes list for that frame that may be evaluated by the decoder 111 may be large, especially if the Hidden Markov Model decoder 110 is being used for OCR. There may be no restrictions on which characters may follow each other in written language. Any character in the character set may follow any other character, so after the decoder 111 has predicted a label name for a character, every character in the character set may need to be considered as a label for the next character. This may result in large fan-out from the last node for the label of the character with the just-predicted label name to possible nodes for the next frame of the frames 142.

For example, at the frame 435, after the label name "A" has been predicted for the sequence of frames ending at the frame 406, the possible nodes list 610 for the previous frame 406 may include the label transition node 208. All of the nodes in the Hidden Markov Model 141 connected to the node 208 may be on a possible nodes list 620 for the frame 435. If the Hidden Markov Model decoder 110 is used in OCR, every label in the Hidden Markov Model 141, such as, for example, the labels 200, 500, 510, and 520, may have their first node connected to the node 208, as there may be no linguistic restrictions on which of the labels may apply to the character that is predicted to start at frame 435. The possible nodes list 620 for the frame 435 may include the nodes 202, 502, 512, and 522, which may the first nodes for each of the labels 200, 500, 510, and 520 in the Hidden Markov Model 141. Additionally, if the decoder 111 predicted segmentation points for the frame 406 in paths through another label in the Hidden Markov Model 141, such as the label 510, the possible nodes list 610 may include the label transition node 518. The possible nodes list 620 for the frame 435 may include the nodes 202, 502, 512, and 522 connected through the label transition node 518.

Because the Hidden Markov Model 141 may only recognize 4 characters, the fan-out may not greatly increase the size of the possible nodes list 620 over the possible nodes list for a frame that is not after a predicted segmentation point. However, larger character sets may result in larger increases in the size of the possible nodes list after a predicted segmentation point. For example, a character set of 52 characters may result in a possible nodes list with at least 52 nodes for a frame after a predicted segmentation point. This may be over ten times more nodes than would be on a possible nodes list for a frame that is not after a predicted segmentation point for the same character set. Evaluating 52 nodes with the decoder 111 may incur significant computational costs. The number of nodes on the possible nodes list may also increase by a factor of the number of label transition nodes that were at the end of paths kept during evaluation of the frame at the segmentation point. For example, with a 52 character set, 15 label transition nodes may be at the ends of paths kept during evaluation of the frame at the segmentation point, resulting in the possible nodes list for the frame after the segmentation point having 52*15=780 nodes to be evaluated by the decoder 111, as each of the 15 label transition nodes may be connected to the first node of each of the 52 labels for the set of 52 characters.

Additionally, the fan-out after a predicted segmentation point may increase the number of nodes that may be on possible nodes lists for subsequent frames. For example, candidate nodes list 635 may include nodes that may be on possible nodes lists for the frame 407. Not all of the nodes in the candidates node list 635 may end up on the possible nodes lists, as the decoder 111 may discard nodes during evaluation using, for example, time-synchronous Viterbi decoding.

Figure 7:
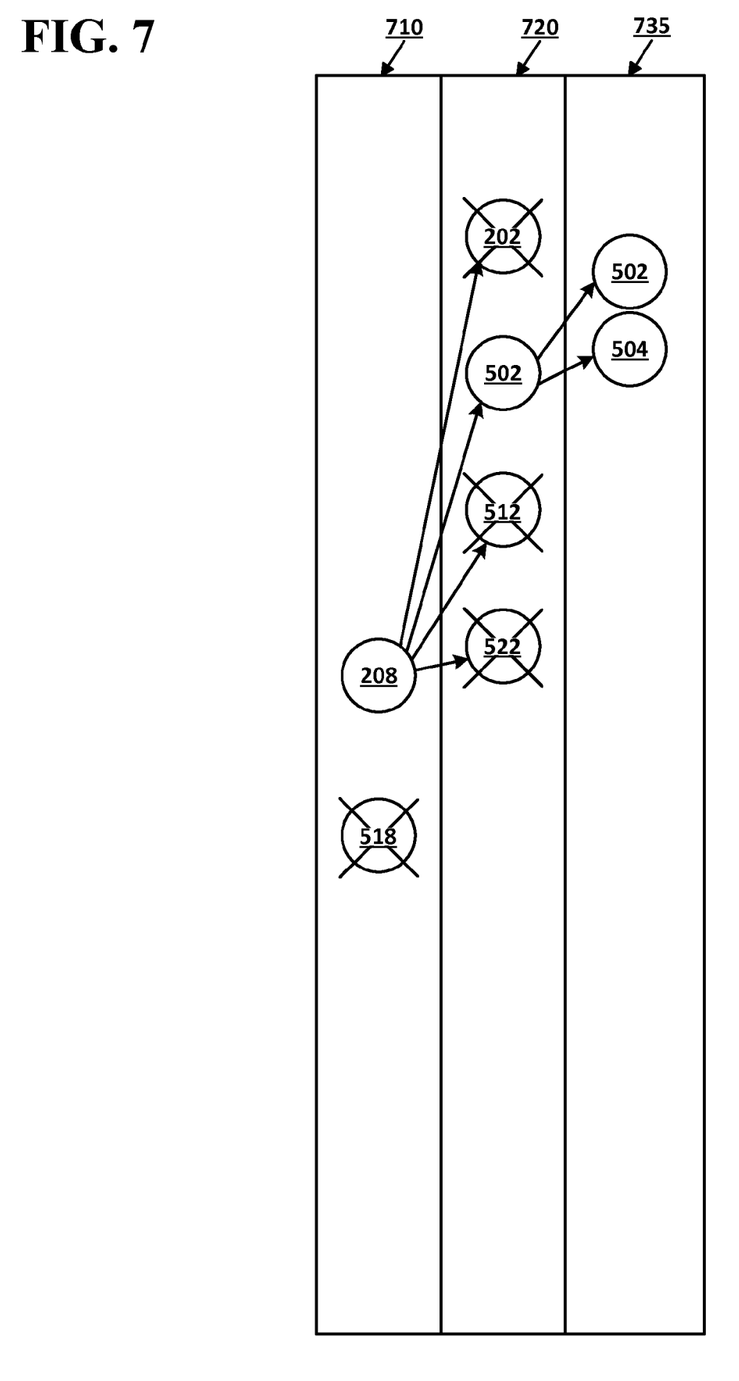
FIG. 7 shows an example of pruned possible nodes lists and fan-out at a predicted segmentation point according to an implementation of the disclosed subject matter.

FIG. 7 shows an example of pruned possible nodes lists and fan-out at a predicted segmentation point according to an implementation of the disclosed subject matter. The number of nodes on the possible nodes list at and after a predicted segmentation point, such as the possible nodes list 610 for the frame 406 and the possible nodes list 620 for the frame 435, may be reduced by pruning and label selection. Pruning may remove nodes from the possible nodes list 620 before the nodes are evaluated by the decoder 111, saving computation time. For example, when decoding the frame 435, pruning the nodes 202 and 512 from the possible nodes list 620 may result in the possible nodes list 720 being used by the decoder 111. Pruning may also reduce the number of nodes on candidate nodes lists for subsequent frames. For example, pruning the label transition node 518 from the possible nodes list 610 may reduce the number of nodes on the possible nodes lists 720 for the frame 435 to half of the number on the possible nodes lists 620, as the decoder 111 may no longer need to evaluate nodes reached through the node 518 when decoding the frame 435. This may also reduce the number of nodes on the candidate nodes list 735, reducing the number of nodes that may need to be considered when decoding the frame 407. Label selection may result in the node 202 being pruned from, or not being added to, the possible nodes list 620, and early pruning may prune the node 512. This may result in the possible nodes list 720 having only one-quarter of the nodes as the possible nodes list 620.

Nodes may be pruned from the possible nodes list 610 for the frame 406 that is at a predicted segmentation point using label transition node pruning. For example, the possible nodes list 610 for the frame 406, which may include label transition nodes 208 and 518, may be pruned by the label transition node pruner 116. Each of the nodes on the possible nodes list 610 may be scored based on any suitable heuristics, including the transition feature functions, observations feature functions, and the score for a previous node to the node at a previous frame to the frame. The score for a node on the possible nodes list 610 may be given by:

$$\text{Score}(n,t) = \text{Score}(n',t-1) + \text{Obs}(n,t) + \text{Trns}(n,n',t) \tag{1}$$

where Score(n, t) is a score for the node n at the frame t, Score(n', t−1) is a score of a previous node to the node n at the previous frame, Obs (n, t) is an observation score of the node n at the frame t, and Trns(n, n', t) is a transition score for the transition to the node n at the frame t from the previous node to the node n.

For example, the score for the node 208 at the frame 406 may be the sum of the score for the node 206 at the frame 406, the observation score for the node 208 at the frame 406, and the transition score for the transition to the node 208 at the frame 406 from the node 206. The transition and emission probabilities of the node 206 and the transition probabilities of the node 208 in the Hidden Markov Model 141 may be used in the scoring of the node 208 at the frame 406.

The score for each of the nodes on the possible nodes list 610 may then be compared to the scores for all of the other nodes on the possible nodes list 610 for the frame 406 to determine which nodes should be pruned from the possible nodes list 610. The pruning may be done according to:

$$\text{Score}(n,t) > \text{Score}(\hat{n},t) + \theta - \eta \tag{2}$$

where Score($\hat{n}$, t) represents the best score for a node on the possible node list at the frame t, $\theta$ may be the beam threshold, and $\eta$ may be the penalty term. The beam threshold $\theta$ may be a threshold used in a beam search, which may be used to prune nodes that are not label transition nodes. A node n may be pruned from the possible node list 610 when (2) is true for the node n, and the node n is a label transition node.

For example, if the scores for the nodes 208, 508, 518, and 528, which may be label transition nodes, at the frame 406 are 0.4, 0.3, 0.7, and 0.6, the best scoring node at the frame may be the node 508. If the beam threshold θ=0.3, and the penalty term η=0.1, the nodes 528 and 518 may be pruned from the possible nodes list, as 0.6 is greater than 0.3+0.3−0.1=0.5, and 0.7 is also greater than 0.5. The decoder 111 may not need to consider the nodes at the ends of paths through the nodes 518 and 528 the frame 435. The possible nodes list received by the decoder 111 from the pruner 115 may include, for example, the nodes 202, 502, 512, and 522 as reached through the nodes 208 and 508, but not through the nodes 518 and 528. This may preclude the character predicted to end at the frame 406 from being labeled with the labels 510 and 520, which may have label names of "C" and "D".

For example, the possible nodes list 610 may include the label transition nodes 208 and 518. Label transition node pruning may be used to prune the label transition node 518, producing the possible nodes list 710 for the predicted segmentation point at frame 406. This may result in fewer nodes on the possible nodes list 720 for the frame 435, as no paths through the node 518 may need to be evaluated by the decoder 111.

The penalty term η may be a product of a label transition penalty factor λ, where 0≤λ≤1, and the beam threshold θ. The label transition penalty factor λ may be a percentage by which the beam threshold θ is reduced when pruning label transition nodes. Using the label transition penalty factor λ, pruning of the nodes from the possible nodes list 610 may be done according to:

$$\text{Score}(n,t) > \text{Score}(\hat{n},t) + (1-\lambda)\theta, \qquad (3)$$

where the node n may be pruned if (3) is true and the node n is a label transition node.

The number of nodes on the possible nodes list 620 for the frame 435 that is after a predicted segmentation point may be limited using label selection. For example, the possible nodes list 620 for the frame 435, which may include nodes connected from the label transition node 208 and 518, may be constructed in part by the label selector 117. Labels with a first node connected to the node 208 for the previous frame 406, for example the labels 200, 500, 510, and 520 in the Hidden Markov Model 141, may be evaluated to determine which of the labels 200, 500, 510, and 520 may be allowed to be used to predict a label name for the sequence of frames starting with the frame 435 after the predicted segmentation point. Each of the labels 200, 500, 510, and 520 may be scored at the frame 435 and may be given a label rank based on the scores for the other labels at the frame. The scores and label ranks may be used to determine which of the labels 200, 500, 510 and 520 may be allowable. The set of allowable labels for the frame 435 may be created according to:

$$L_t = \{l \,|\, \text{Score}(l,t) \leq \text{Score}(\hat{l},t) + \alpha \wedge \text{Rank}(l,t) \leq \beta\} \qquad (4)$$

where $L_t$ is the set of allowable labels, Score(l, t) is a score for the label l at frame t, Score($\hat{l}$, t) is a score for the best scoring label the frame t, α is a first parameter, Rank(l, t) is a label rank for the label l at frame t, and β is a second parameter. As described herein, the first parameter α controls how close the label l's score must be to the score of the best scoring label $\hat{l}$ at the frame t in order to be added to the set of allowable labels $L_t$. The second parameter β limits the number of labels that can be added to the set of allowable labels $L_t$. Score(l, t) may be calculated in any suitable manner, for example, using fast-match, or may be set equal to $Q_l(0, t)$, which may be the score of the initial state of the optical model, if the Hidden Markov Model 141 is used in OCR, or acoustic model or any other suitable model for the use of the Hidden Markov Model 141, for the label l at frame t. Score(l, t) may be cached to avoid having to re-compute $Q_l(0, t)$ at later frames.

For example, if the scores for the labels 200, 500, 510, and 520 are 0.7, 0.3, 0.6, and 0.5, the best scoring label at the frame 435 may be the label 500. The label ranks for the labels 200, 500, 510, and 520 may be 4, 1, 3, 2. If the first parameter α=0.3 and the parameter β=2, then the labels 500 and 520 may be added to the set of allowable labels $L_t$. The label 200 may not be an allowable label because the score of 0.7 is greater than 0.3+0.3=0.6 and also because the label rank of 4 is greater than 2. The label 510 may not be an allowable label because, although the score of 0.6 not greater than 0.6, the label rank of 3 is greater than 2.

The possible nodes list for a frame after a segmentation point may be constructed to include any node that is connected to a label transition node on the possible nodes list for the previous frame and is the first node for a label in the set of allowable labels $L_t$, instead of including all of the first nodes for labels in the Hidden Markov Model 141. For example, because the labels 200 and 510 were not added to the set of allowable labels $L_t$, the nodes 202 and 512 may not be included in the possible nodes list for the frame after the segmentation point. The decoder 111 may not need to consider the nodes 202 and 512 at the frame after the segmentation point, as the nodes 202 and 512 may not be on the possible nodes list received by the decoder 111 from the pruner 115.

For example, the possible nodes list 610 may include the label transition nodes 208 and 518. Label transition node pruning may prune the label transition node 518, resulting in the possible nodes list 710. The possible nodes list 710 may be used to construct the possible nodes list 720 for the frame 435. Label selection may result in the labels 500 and 520, being selected, while the labels 200 and 510 are not selected. The possible nodes list 720 may be constructed to include the nodes 502, and 522, as the first nodes of allowable labels connected from the label transition node 208, but not the nodes 202 and 512. This may preclude the character predicted to start at the frame 435 from being labeled with the labels 200 and 510, which may have label names of "A" and "C".

Nodes may be pruned from any possible nodes list for any frame using early pruning. For example, the possible nodes list 620 for the frame 435, which may include nodes 202, 502, 512, and 522 connected from the nodes 208 and 518, may be pruned by the early pruner 118. The nodes on the possible nodes list 620 for the frame 435 may each be given an observation score. The pruning may be done according to:

$$\text{Score}(n',t-1) + \text{Obs}(n,t) > \text{Score}(\hat{n},t) + \theta \qquad (5)$$

where Score(n', t−1) is a score of the previous node to the node n at a previous frame, Obs(n, t) is the observation score of the node n at the frame t, Score($\hat{n}$, t) is the current best score for a node on the possible nodes list at the frame t, and θ is the beam threshold, as used by, for example, the label transition node pruner 116. Score(n', t−1)+Obs(n, t) thus represents an early pruning score for the node n at the frame t. According to implementations disclosed herein, a node n may be pruned when (5) is true.

The current best score may be an exact pruning score, incorporating the transition score as in (1). For example, the first node evaluated by early pruning from the possible nodes list may be given an exact pruning score by default. The second node evaluated by early pruning may be assigned an early pruning score, which may be compared to the exact pruning score for the first node, as in (5). If (5) is true for the second node, the second node may be pruned from the possible nodes list. If (5) is false, the second node may be given an exact pruning score as in (1). If the exact pruning score for the second node is better, for example, lower, than the exact pruning score for the first node, the exact pruning score for the second node may become the current best score, so that an early pruning score for a third node may be compared against the exact pruning score for the second node to determine if the third node should be pruned.

For example, the observation scores for the nodes 202, 502, 512, and 522 at the frame 435 may be 0.2, 0.2, 0.6, and 0.7, and the score for the previous node 208 at the previous frame 406 may be 0.1. The node 202 may be the first node considered at the frame 435, and may be given an exact pruning score. The node 202 may have a transition score of 0.1, resulting in an exact pruning score of 0.4. The node 502 may have an early pruning score of 0.3, which may be compared to the current best score at the frame of 0.4. If the beam threshold θ=0.3, the node 502 node may not be pruned, as 0.3 is less than 0.7. The node 502 may then be given a transition score, which may be 0.2, and an exact pruning score, which may be 0.5. The node 202 may remain the current best scoring node at the frame 435. The node 512 may have an early pruning score of 0.7, which may be equal to the sum of the exact pruning score for the node 202 and the beam threshold, so the node 512 may not be pruned. The node 512 may be given an exact pruning score including a transition score. The node 522 may have an early pruning score of 0.8. Because 0.8 is greater than 0.7, the node 522 may be pruned, and may not be assigned an exact pruning score. This may preclude the character predicted to start at the frame 435 from being labeled with the label 520, which may have the label name of "D".

Early pruning may also use a tunable parameter α, which may be an estimation of the transition score Trns(n, n', t). Using the tunable parameter α, pruning may be done according to:

$$\text{Score}(n',t-1)+\text{Obs}(n,t)+\alpha > \text{Score}(\bar{n},t)+\theta \quad (6)$$

The early pruning score may also be used to prune the possible nodes list using histogram pruning Each of the nodes on the possible nodes list may be given an early pruning score. The histogram pruning may have a parameter β, which may be the number of nodes the histogram pruning will retain on the possible nodes list. The β best scoring nodes may be retained, while all other nodes may be pruned from the possible nodes list.

The label transition node pruner 116, the label selector 117, and the early pruner 118 may be used in order. The label transition node pruner 116 may first prune label transition nodes from a possible nodes list for a frame at a segmentation point. The label selector 117 may then construct the possible nodes list for the frame after the segmentation point based on the nodes not pruned from the possible nodes list for the frame at the segmentation point. The early pruner 118 may then prune nodes from the possible nodes list for the frame after the segmentation point. The early pruner may also be used for nodes at any other frames 142 in the Hidden Markov Model 141.

In some instances, the possible nodes list 620 for the frame 435 after a predicted segmentation point may include nodes that are not connected from label transition nodes. For example, if the decoder 111 kept more than one node for the frame 406, such as the node 204 in addition to the node 208, the possible nodes list 610 for the frame 406 may include the node 204 in addition to the node 208. The node 204 may not be a label transition node, and may be pruned with techniques used for non-label transition nodes, such as, for example, beam search pruning. If the node 204 is not pruned from the possible nodes list 610, the possible nodes list 620 may include the nodes 204 and 206, connected from the node 204. In some instances, the node at the end of a label, such as the node 208 at the end of the label 200, may be connected by transitions to nodes that are not the first node for a label, which may also result in a possible nodes list 620 for the frame 435 at a predicted segmentation point including nodes that are not connected from label transition nodes.

The possible nodes list 720, which may be the result of pruning the possible nodes list 620, may be produced during the decoding of the frame 435 by the decoder 111, which may be using, for, example, time-synchronous Viterbi decoding. The decoder 111 may also discard nodes from the possible nodes list 720 during decoding using standard beam pruning. This may result in a final nodes list, which may include nodes from the possible list 720 that were retained during decoding and may correspond to the frame 435. A new possible nodes list may then be generated for the next frame 407 based on the final nodes list by, for example, the node list generator 113. The new possible nodes may include nodes connected by transitions in the Hidden Markov Model 141 to nodes on the final node list. For example, if the final nodes list for the frame 435 includes the nodes 502 and 522, the possible nodes list generated for the frame 407 may include the nodes 502, 504, 522, and 524. If the frame decoded by the decoder 111 is the last frame of the input, for example, the frame 421, it may not be necessary to generate another possible nodes list, as there may be no more input to decode.

Nodes that have been pruned from a possible nodes list may not be considered during subsequent pruning. For example, a node pruned by the early pruner 118 may not need to be considered by the beam pruner 119.

Figure 8:
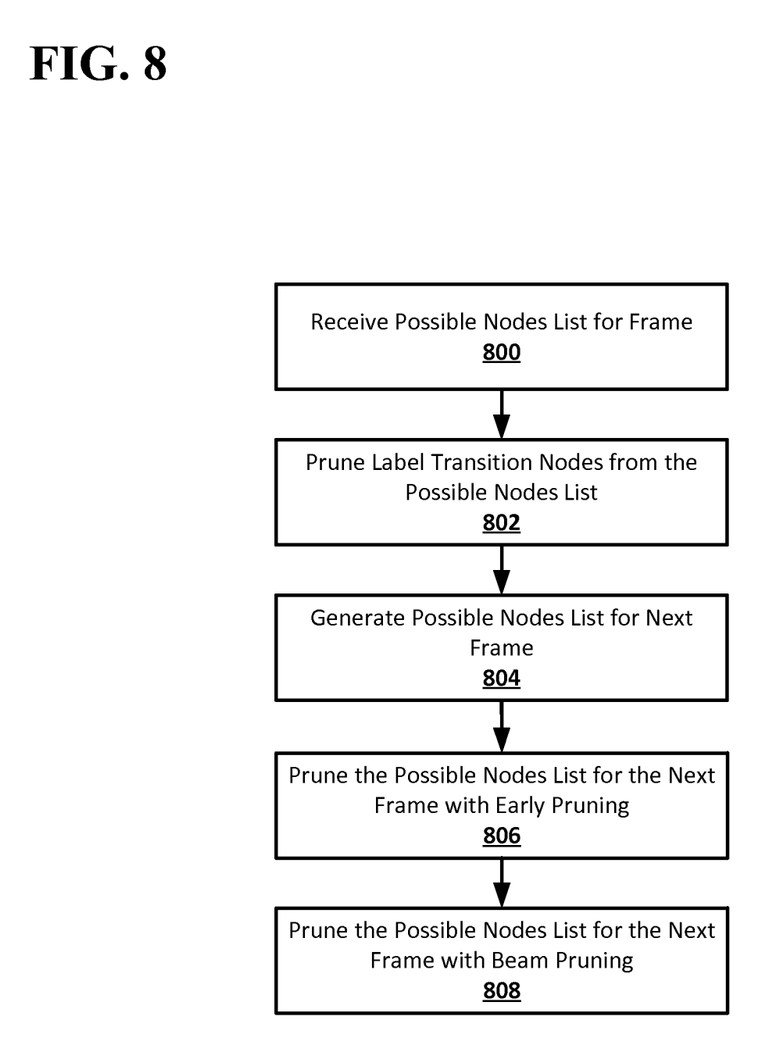
FIG. 8 shows an example process for pruning and label selection in Hidden Markov Model-based OCR according to an implementation of the disclosed subject matter.

FIG. 8 shows an example process for pruning and label selection in Hidden Markov Model-based OCR according to an implementation of the disclosed subject matter. At 800, a possible nodes list including label transition nodes may be received. For example, the pruner 115 may receive the possible nodes list 610 for the frame 406 from the frames 142. The possible nodes list 610 may include nodes not discarded during decoding of the frame 406 by the decoder 111, including the label transition nodes 208 and 518. The frame 406 may be at a predicted segmentation point in the frames 142.

At 802, nodes may be pruned from the possible nodes list. For example, the pruner 115 may use the label transition node pruner 116 to prune label transition nodes from the possible nodes list 610. The label transition node pruner 116 may use the transitions, transitions probabilities, the emissions, the emissions probabilities and the structure of the labels 200, 510, 520, and 530 from the Hidden Markov Model 141 when scoring nodes during pruning. Pruning nodes from the possible nodes list 610 may reduce the fan-out at the predicted segmentation point of the frame 406, producing the possible nodes list 710. For example, the label transition node pruner 116 may prune the node 518 from the possible nodes list 610.

At 804, a possible nodes list may be generated for the next frame. For example, the node list generator 113 may use the final node list for the frame 406, which may be the possible node list 710, at the segmentation point to generate the possible node list 720 for the frame 435, after the segmentation point. The label selector 117 of the pruner 115 may be used to select labels from the Hidden Markov Model 141 that are allowed to be connected to the label transition node 208. The label selector 117 may, for example, determine that the labels 500, 510, and 520 are allowed to be connected to the label transition node 208 from the frame 406, adding the nodes 502, 512, and 522 to the possible nodes list 720 for the frame 435.

At 806, nodes may be pruned from the possible nodes list for the next frame using early pruning. For example, the pruner 115 may use the early pruner 118 to prune nodes from the possible nodes list 720 for the frame 435. The early pruner 115 may prune any node from the possible nodes list 720, such as, for example, node 512. The early pruner 115 may prune nodes form the possible nodes list 720 based on an early pruning score for the nodes at the frame 435.

At 808, nodes may be pruned from the possible nodes list for the next frame using beam pruning. For example, the pruner 115 may use the beam pruner 119 to prune nodes from the possible nodes list 720 for the frame 435. The beam pruner 119 may use beam pruning or any other standard pruning method used in time-synchronous Viterbi decoding. The beam pruner 119 may remove nodes from the possible nodes list 720, producing a final nodes list for the frame 435. The final nodes list for the frame 435 may be used by, for example, the node list generator 113, to generate a possible nodes list for the frame 407.

Figure 9:
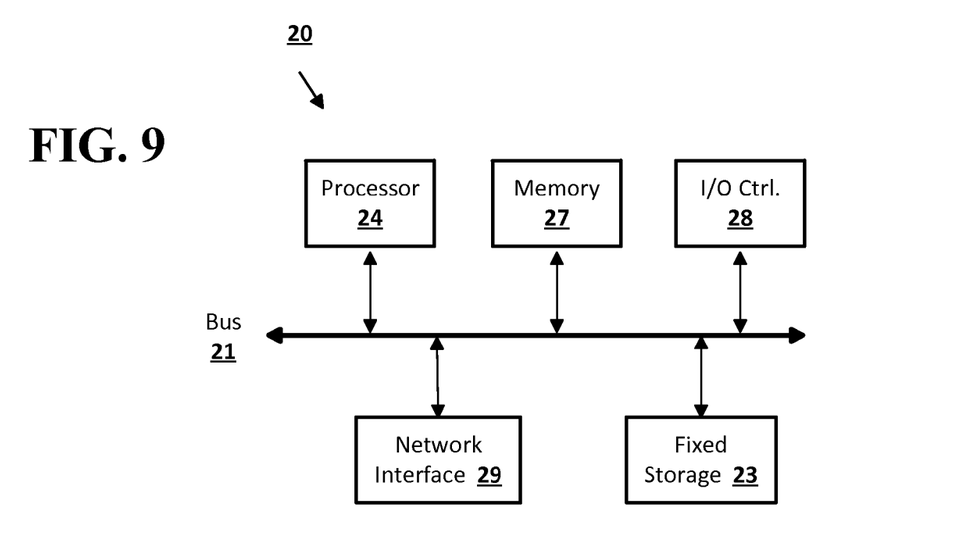
FIG. 9 shows a computer according to an embodiment of the disclosed subject matter.

Embodiments of the presently disclosed subject matter may be implemented in and used with a variety of component and network architectures. FIG. 9 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 10.

Many other devices or components (not shown) may be connected in a similar manner, such as document scanners, digital cameras, auxiliary, supplemental, or backup systems, or the like. Conversely, all of the components shown in FIG. 9 need not be present to practice the present disclosure. The components can be interconnected in different ways from that shown. The operation of a computer such as that shown in FIG. 9 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 10:
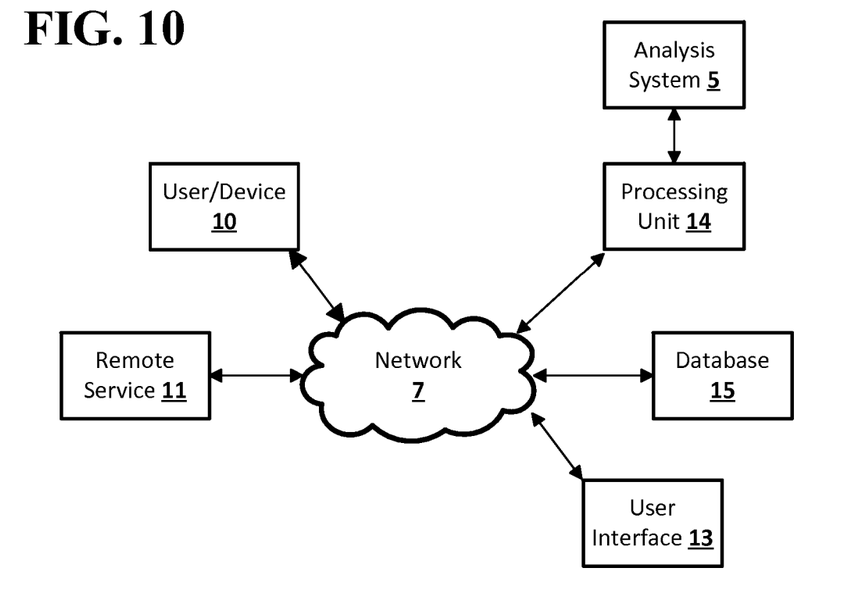
FIG. 10 shows a network configuration according to an embodiment of the disclosed subject matter.

FIG. 10 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

What is claimed is:

1. A method of performing optical text recognition on an input image using a Hidden Markov Model, the method comprising:
    identifying a node of the Hidden Markov Model, wherein the node is a label transition node;
    receiving a frame, wherein the frame is a portion of the input image and wherein the frame has been determined to be a predicted character boundary in the input image; and
    pruning the node from a possible nodes list for the frame with label transition node pruning, wherein the possible nodes list for the frame is a list of nodes in the Hidden Markov Model that may be evaluated to determine whether they correspond to the frame, the pruning comprising:
        scoring the node at the frame to obtain a score, and
        pruning the node when the score is greater than a sum of a best score at the frame and a beam threshold minus a penalty term.

2. The method of claim 1, further comprising:
    generating a possible nodes list for a subsequent frame to the frame using label selection by:
    scoring a label at the subsequent frame to obtain a label score;
    ranking the label based on the label score to obtain a label rank; and
    adding a first node of the label to the possible nodes list for the subsequent frame when the label score is less than or equal to a sum of a best label score at the subsequent frame and a first parameter or the label rank is less than or equal to a second parameter.

3. The method of claim 2, wherein the label comprises a label name associated with a character from a character set.

4. The method of claim 2, wherein scoring the label at the subsequent frame comprises using fast-match.

5. The method of claim 2, wherein scoring the label at the subsequent frame comprises scoring an initial state of an optical model for the label at the subsequent frame.

6. The method of claim 5, further comprising:
    storing the label score; and
    reusing the label score during decoding of the subsequent frame.

7. The method of claim 2, wherein the first parameter and the second parameter are tunable parameters for label selection.

8. The method of claim 2, further comprising pruning a second node from the possible nodes list for the subsequent frame with early pruning, wherein early pruning comprises:
    scoring the second node at the subsequent frame with at least one observation feature function to obtain an observation score; and
    pruning the second node when an early pruning score is greater than a sum of a current best score at the subsequent frame and the beam threshold, wherein the early pruning score is the sum of the observation score and a previous node score, and wherein the previous node score is a score for a previous node to the second node at a previous frame to the subsequent frame.

9. The method of claim 8, wherein early pruning further comprises:
    estimating a parameter based on at least one transition feature function; and
    adding the parameter to the early pruning score.

10. The method of claim 1, wherein the possible nodes list is used in time-synchronous Viterbi decoding of the frame.

11. The method of claim 1, wherein the penalty term is a product of a label transition penalty factor and the beam threshold, and wherein the label transition penalty factor has a value greater than or equal to 0 and less than or equal to 1.

12. The method of claim 1, wherein the possible nodes list comprises nodes of the Hidden Markov Model connected to nodes in a second possible nodes list for a previous frame.

13. A system comprising one or more computers and one or more storage devices storing instructions that when executed by the one or more computers cause the one or more computers to perform operations of performing optical text recognition on an input image using a Hidden Markov Model, the operations comprising:
    identifying a node of the Hidden Markov Model, wherein the node is a label transition node;
    receiving a frame, wherein the frame is a portion of the input image and wherein the frame has been determined to be a predicted character boundary in the input image; and
    pruning the node from a possible nodes list for the frame with label transition node pruning, wherein the possible nodes list for the frame is a list of nodes in the Hidden Markov Model that may be evaluated to determine whether they correspond to the frame, the pruning comprising:
        scoring the node at the frame to obtain a score, and
        pruning the node when the score is greater than a sum of a best score at the frame and a beam threshold minus a penalty term.

14. The system of claim 13, the operations further comprising:
    generating a possible nodes list for a subsequent frame to the frame using label selection by:
    scoring a label at the subsequent frame to obtain a label score;
    ranking the label based on the label score to obtain a label rank; and
    adding a first node of the label to the possible nodes list for the subsequent frame when the label score is less than or equal to a sum of a best label score at the subsequent frame and a first parameter or the label rank is less than or equal to a second parameter.

15. The system of claim 14, wherein the label comprises a label name associated with a character from a character set.

16. The system of claim 14, wherein scoring the label at the subsequent frame comprises using fast-match.

17. The system of claim 14, wherein scoring the label at the subsequent frame comprises scoring the initial state of an optical model for the label at the subsequent frame.

18. The system of claim 17, the operations further comprising:
    storing the label score; and
    reusing the label score during decoding of the subsequent frame.

19. The system of claim 13, the operations further comprising pruning a second node from the possible nodes list for the subsequent frame with early pruning, wherein early pruning comprises:
    scoring the second node at the subsequent frame with at least one observation feature function to obtain an observation score; and
    pruning the second node when an early pruning score is greater than a sum of a current best score at the subsequent frame and the beam threshold, wherein the early pruning score is the sum of the observation score and a previous node score, and wherein the previous node score is a score for a previous node to the second node at a previous frame to the subsequent frame.

20. One or more non-transitory storage media storing instructions that when executed by one or more computers cause the one or more computers to perform operations of performing optical text recognition on an input image using a Hidden Markov Model, the operations comprising:
 identifying a node of the Hidden Markov Model, wherein the node is a label transition node;
 receiving a frame, wherein the frame is a portion of the input image and wherein the frame has been determined to be a predicted character boundary in the input image; and
 pruning the node from a possible nodes list for the frame with label transition node pruning, wherein the possible nodes list for the frame is a list of nodes in the Hidden Markov Model that may be evaluated to determine whether they correspond to the frame, the pruning comprising:
  scoring the node at the frame to obtain a score, and
  pruning the node when the score is greater than a sum of a best score at the frame and a beam threshold minus a penalty term.

21. The one or more non-transitory storage media of claim 20, wherein the operations further comprise:
 generating a possible nodes list for a subsequent frame to the frame using label selection by:
 scoring a label at the subsequent frame to obtain a label score;
 ranking the label based on the label score to obtain a label rank; and
 adding a first node of the label to the possible nodes list for the subsequent frame when the label score is less than or equal to a sum of a best label score at the subsequent frame and a first parameter or the label rank is less than or equal to a second parameter.

22. The one or more non-transitory storage media of claim 21, wherein the operations further comprise:
 pruning a second node from the possible nodes list for the subsequent frame with early pruning, wherein early pruning comprises:
  scoring the second node at the subsequent frame with at least one observation feature function to obtain an observation score; and
  pruning the second node when an early pruning score is greater than a sum of a current best score at the subsequent frame and the beam threshold, wherein the early pruning score is the sum of the observation score and a previous node score, and wherein the previous node score is a score for a previous node to the second node at a previous frame to the subsequent frame.

23. The one or more non-transitory storage media of claim 22, wherein early pruning further comprises:
 estimating a parameter based on at least one transition feature function; and
 adding the parameter to the early pruning score.

24. The one or more non-transitory storage media of claim 20, wherein the penalty term is a product of a label transition penalty factor and the beam threshold, and wherein the label transition penalty factor has a value greater than or equal to 0 and less than or equal to 1.

25. The one or more non-transitory storage media of claim 20, wherein the possible nodes list comprises nodes of the Hidden Markov Model connected to nodes in a second possible nodes list for a previous frame.

* * * * *